United States Patent
Maruyama et al.

(10) Patent No.: US 12,000,636 B2
(45) Date of Patent: Jun. 4, 2024

(54) LIQUID LEVEL DETECTOR AND AIR CONDITIONING APPARATUS INCLUDING THE LIQUID LEVEL DETECTOR

(71) Applicant: Mitsubishi Electric Corporation, Tokyo (JP)

(72) Inventors: Hiroki Maruyama, Tokyo (JP); Takuya Matsuda, Tokyo (JP); Hiroyuki Okano, Tokyo (JP); Naomichi Tamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 262 days.

(21) Appl. No.: 17/634,682

(22) PCT Filed: Nov. 18, 2019

(86) PCT No.: PCT/JP2019/045057
§ 371 (c)(1),
(2) Date: Feb. 11, 2022

(87) PCT Pub. No.: WO2021/100080
PCT Pub. Date: May 27, 2021

(65) Prior Publication Data
US 2022/0325932 A1    Oct. 13, 2022

(51) Int. Cl.
*F25B 49/02* (2006.01)
*F25B 43/00* (2006.01)
*G01F 23/14* (2006.01)

(52) U.S. Cl.
CPC .......... *F25B 49/022* (2013.01); *F25B 43/006* (2013.01); *G01F 23/14* (2013.01);
(Continued)

(58) Field of Classification Search
CPC .... F25B 49/02; F25B 43/006; F25B 2500/19; F25B 2400/19; F25B 2700/04; F25B 2700/2113
See application file for complete search history.

(56) References Cited

U.S. PATENT DOCUMENTS

2015/0292932 A1    10/2015   Ochiai et al.
2017/0016660 A1*    1/2017   Nishiyama ............... F25B 41/20
2020/0271503 A1     8/2020   Asanuma et al.

FOREIGN PATENT DOCUMENTS

JP    2006250480 A  *  9/2006
JP    2006250480 A     9/2006
(Continued)

OTHER PUBLICATIONS

Fujino, Refrigeration Device, 2006, Full Document (Year: 2006).*
(Continued)

*Primary Examiner* — Nael N Babaa
(74) *Attorney, Agent, or Firm* — Posz Law Group, PLC

(57) ABSTRACT

A liquid level detector includes: a vertically-mounted accumulator that stores refrigerant; a heater that heats the accumulator; a temperature detector that detects a surface temperature of the accumulator; a pressure detector that detects a pressure of the refrigerant in the accumulator; and a controller. The controller detects a position of a liquid surface of the refrigerant in the accumulator based on a surface temperature of the accumulator detected by the temperature detector when the accumulator is heated by the heater, and a pressure of the refrigerant in the accumulator detected by the pressure detector.

3 Claims, 3 Drawing Sheets

(52) U.S. Cl.
CPC ....... *F25B 2500/19* (2013.01); *F25B 2700/04* (2013.01); *F25B 2700/19* (2013.01); *F25B 2700/2113* (2013.01)

(56) References Cited

FOREIGN PATENT DOCUMENTS

| | | |
|---|---|---|
| JP | 6041986 B | 12/2016 |
| WO | 2014054312 A1 | 4/2014 |
| WO | 2019064480 A1 | 4/2019 |
| WO | 2019065242 A1 | 4/2019 |

OTHER PUBLICATIONS

International Search Report dated Feb. 10, 2020, issued in corresponding International Patent Application No. PCT/JP2019/045057 (and English Machine Translation).

Office Action dated Nov. 1, 2022 issued in corresponding JP Patent Application No. 2021-558043 (with English machine translation). Note that the English machine translation contains a typographical error in the shipping date; the correct shipping date is Nov. 1, 2022, not Nov. 1, 2020.

\* cited by examiner

LIQUID LEVEL DETECTOR AND AIR CONDITIONING APPARATUS INCLUDING THE LIQUID LEVEL DETECTOR

CROSS REFERENCE TO RELATED APPLICATION

This application is a U.S. National Stage Application of International Patent Application No. PCT/JP2019/045057, filed on Nov. 18, 2019, the disclosure of which is incorporated herein by reference.

TECHNICAL FIELD

The present disclosure relates to a liquid level detector configured to detect a position of a liquid surface of a liquid in an accumulator, and also relates to an air-conditioning apparatus including the same.

BACKGROUND

A related-art air-conditioning apparatus is provided with an accumulator configured to store, for example, excessive refrigerant, which is generated due to a difference in operating conditions between a cooling operation and a heating operation. When the amount of refrigerant supplied to a compressor is not stable and the amount of the stored excessive refrigerant is large, an excessive liquid refrigerant is supplied from the accumulator to a compressor, causing improper operation due to compression of the liquid refrigerant in the compressor.

Under such circumstances, a method for determining whether liquid refrigerant is stored in an accumulator or not has been proposed (see Patent Literature 1, for example). In Patent Literature 1, a plurality of temperature detectors are provided along a height direction on the surface of a horizontally-mounted accumulator, of which the longitudinal direction extends in the horizontal direction. By using temperatures detected by the plurality of temperature detectors, when a difference in temperature between two adjacent locations is equal to or higher than a predetermined reference value, a liquid surface of refrigerant in the accumulator is determined to be present between the two adjacent locations.

Patent Literature

Patent Literature 1: International Publication No. 2019/065242

The technology disclosed in Patent Literature 1 has a problem that, since the accumulator is a horizontally-mounted accumulator, rippling tends to occur on a liquid surface of liquid refrigerant when the liquid refrigerant swirls in the accumulator, and the accuracy of detecting the position of the liquid surface of the refrigerant tends to be poor. In addition, this technology has a problem that a plurality of temperature detectors are required to be installed to detect the position of the liquid surface of the refrigerant in the accumulator, which results in an increased cost.

SUMMARY

The present disclosure has been made to solve the above-mentioned problems, and an object thereof is to provide a liquid level detector which can improve the accuracy of detecting the position of a liquid surface of refrigerant and also can reduce the cost, as well as to provide an air-conditioning apparatus including the same.

The liquid level detector according to the present disclosure comprises a vertically-mounted accumulator configured to store refrigerant; a heater configured to heat the accumulator; a temperature detector configured to detect a surface temperature of the accumulator; a pressure detector configured to detect a pressure of the refrigerant in the accumulator; and a controller configured to detect a position of a liquid surface of the refrigerant in the accumulator based on the surface temperature of the accumulator detected by the temperature detector when the accumulator is heated by the heater and the pressure of the refrigerant in the accumulator detected by the pressure detector.

An air-conditioning apparatus according to another embodiment of the present disclosure includes the above-mentioned liquid level detector.

According to the liquid level detector of the present disclosure and the air-conditioning apparatus including the liquid level detector, due to the provision of a vertically-mounted accumulator, rippling hardly occurs on the liquid surface of the refrigerant in the accumulator as compared with a case where a horizontally-mounted accumulator is provided, whereby the accuracy of detecting the position of the liquid surface of the refrigerant can be improved. Further, based on the surface temperature of the accumulator detected by the temperature detector and the pressure of the refrigerant in the accumulator detected by the pressure detector, the position of the liquid surface of the liquid in the accumulator is detected. Therefore, a plurality of the temperature detectors are not required to be provided, leading to a reduction in cost.

DETAILED DESCRIPTION

An embodiment of the present disclosure will be described below with reference to the drawings. The present disclosure is not limited by Embodiment mentioned below. Also, note that, in the following drawings, the relationship between the sizes of each component may differ from that of actual ones.

Embodiment

Figure 1:
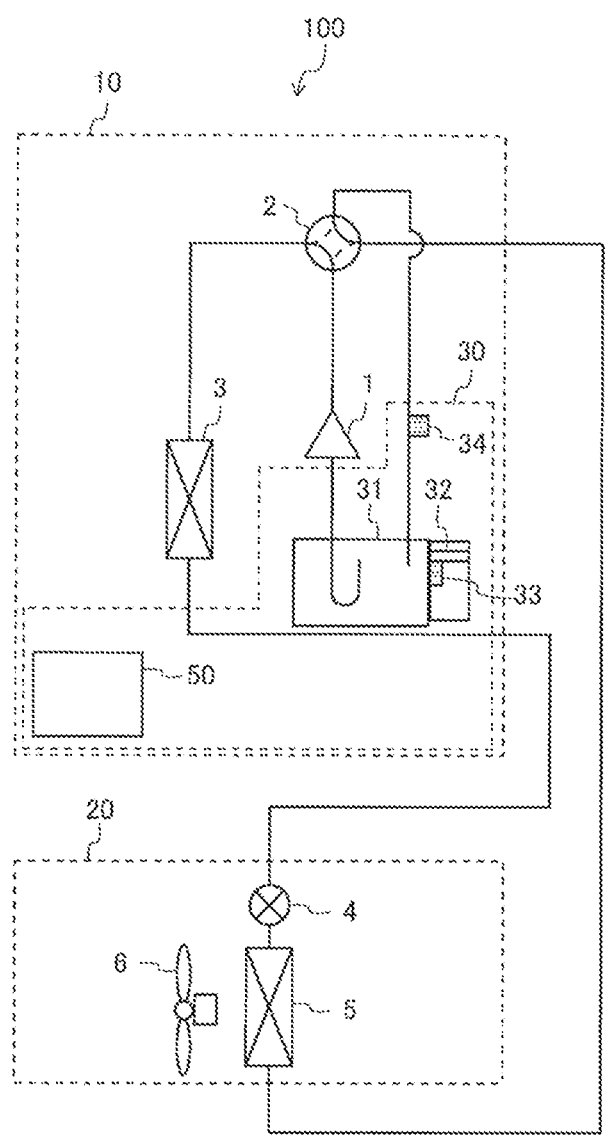
FIG. 1 is a schematic diagram illustrating one example of the configuration of an air-conditioning apparatus according to Embodiment.
Figure 2:
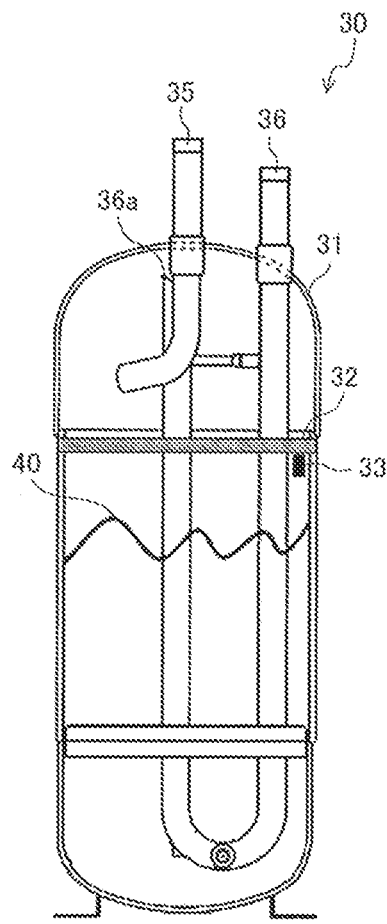
FIG. 2 is a cross-sectional view schematically illustrating the structure of the liquid level detector illustrated in FIG. 1.

FIG. 1 is a schematic diagram illustrating one example of the configuration of an air-conditioning apparatus 100 according to Embodiment. FIG. 2 is a cross-sectional view schematically illustrating the structure of the liquid level detector 30 illustrated in FIG. 1.

As illustrated in FIG. 1, the air-conditioning apparatus 100 of Embodiment includes an outdoor unit 10 and an indoor unit 20. The outdoor unit 10 is a heat source unit and supplies cooling energy or heating energy to the indoor unit 20. The indoor unit 20 is provided at a location where it can supply conditioned air to an air-conditioned space such as a room, and supplies cooling air or heating air to the air-conditioned space by cooling energy or thermal energy supplied from the outdoor unit 10.

In the air-conditioning apparatus 100 of Embodiment, a single indoor unit 20 is connected to a single outdoor unit 10. However, the number of the outdoor units 10 and the indoor units 20 is not limited thereto. For example, a configuration in which two or more indoor units 20 are connected to two or more outdoor units 10 is also possible. The air-conditioning apparatus 100 may also be provided with a relay unit being interposed between the outdoor unit 10 and the indoor unit 20.

The outdoor unit 10 is provided with a compressor 1, a flow path switching device 2, an outdoor heat exchanger 3, and a liquid level detector 30.

The liquid level detector 30 includes an accumulator 31, a heater 32, a temperature detector 33, a pressure detector 34, and a controller 50. The controller 50 may be installed in the indoor unit 20 instead of the outdoor unit 10, or may be installed outside the outdoor unit 10 and the indoor unit 20.

The indoor unit 20 includes an expansion device 4, an indoor heat exchanger 5, and an indoor fan 6.

The air-conditioning apparatus 100 includes a refrigerant circuit through which refrigerant circulates. In the refrigerant circuit, the compressor 1, the flow path switching device 2, the outdoor heat exchanger 3, the expansion device 4, the indoor heat exchanger 5, and the accumulator 31 are sequentially connected by pipes.

The compressor 1 sucks low-temperature and low-pressure refrigerant, compresses the sucked refrigerant, and discharges high-temperature and high-pressure refrigerant. The compressor 1 is, for example, an inverter compressor of which the capacity, i.e. the amount of refrigerant delivered per unit time, is controlled by changing the operating frequency.

The flow path switching device 2 is, for example, a four-way valve, which switches the operation between the cooling operation and the heating operation by changing the direction of flow of the refrigerant. Instead of a four-way valve, a two-way valve and a three-way valve may be used in combination as the flow path switching device 2.

The outdoor heat exchanger 3 functions as an evaporator or a condenser, causing heat exchange to be performed between air and the refrigerant to thereby evaporate the refrigerant into gas or condense the refrigerant into liquid. The outdoor heat exchanger 3 functions as an evaporator during the heating operation and functions as a condenser during the cooling operation.

The expansion device 4 reduces the pressure of the refrigerant to thereby expand the refrigerant. The expansion device 4 is, for example, an electronic expansion valve whose opening degree of throttling can be adjusted, and by adjusting the opening degree, the pressure of the refrigerant flowing into the indoor heat exchanger 5 is controlled during the cooling operation, and the refrigerant pressure flowing into the outdoor heat exchanger 3 is controlled during the heating operation.

The indoor heat exchanger 5 functions as an evaporator or a condenser, causing heat exchange to be performed between air and the refrigerant to thereby evaporate the refrigerant into gas or condense the refrigerant into liquid. The indoor heat exchanger 5 functions as a condenser during the heating operation and as an evaporator during the cooling operation.

The accumulator 31 is installed on the suction side of the compressor 1 and is used to store excessive refrigerant caused by a difference in operating conditions between the cooling operation and the heating operation, or excessive refrigerant generated by transient changes in operation, or other types of excessive refrigerant. This accumulator 31 is a vertically-mounted accumulator installed so as to allow the longitudinal direction thereof to be vertically oriented, as illustrated in FIG. 2. An upper portion of the accumulator 31 is provided with an inlet pipe 35 to allow refrigerant to flow into the inside, and a U-shaped outlet pipe 36 to supply the refrigerant inside the accumulator 31 into the compressor 1.

When the gas-liquid mixed refrigerant flows into the inside of the accumulator 31 from the inlet pipe 35, in order to allow the liquid refrigerant to be dropped to a lower part of the accumulator 31 by centrifugal force and gravity, and allow the gas refrigerant to be supplied to the compressor 1 from the outlet pipe 36 in an upper part of the accumulator 31, the liquid refrigerant is caused to swirl in the accumulator 31. When the liquid refrigerant swirls in the accumulator 31, rippling occurs on the liquid surface of the refrigerant. Generally, as compared with a vertically-mounted accumulator, rippling tends to occur easily on the liquid surface of the refrigerant in a horizontally-mounted accumulator. Therefore, by allowing the accumulator 31 to be a vertically-mounted accumulator, it becomes possible to make rippling hardly occur on the liquid surface of the refrigerant when the liquid refrigerant swirls in the accumulator 31 as compared with a horizontally-mounted accumulator.

The heater 32 is, for example, an electric heater, which is attached to the surface of the accumulator 31 and heats the surface of the accumulator 31. The heater 32 is circumferentially wound around an upper portion of the accumulator 31. The upper portion is positioned at a height where excessive liquid refrigerant does not flow in from the accumulator 31. The heater 32 heats the surface of the accumulator 31 uniformly in the circumferential direction.

The temperature detector 33 is a thermistor, for example, and is installed on the surface of the accumulator 31 and in the vicinity of the heater 32 to thereby detect the surface temperature Ta of the upper portion of the accumulator 31. The temperature detector 33 is provided so as to be positioned lower than an inlet 36a of the outlet pipe 36. In Embodiment, since the position of the liquid refrigerant is determined based on the position at which the temperature detector 33 is provided, by providing the temperature detector 33 at the above-mentioned position, the liquid surface 40 of the refrigerant is prevented from reaching the inlet 36a of the outlet pipe 36.

The pressure detector 34 is a pressure sensor, for example, and is provided on an upstream side of the accumulator 31 and is configured to detect a pressure Pe of the refrigerant flowing into the accumulator 31. This pressure detector 34 is also used to control the degree of superheat to prevent a liquid back phenomenon. The pressure Pe of the refrigerant can be regarded as the refrigerant pressure in the accumulator 31.

As shown in FIG. 1, the indoor fan 6 is installed near the indoor heat exchanger 5 to supply indoor air to the indoor heat exchanger 5, and the rotation speed thereof is controlled to adjust the amount of air sent by the indoor fan 6. As the indoor fan 6, a centrifugal fan or a multi-blade fan driven by a motor such as a Direct Current (DC) fan motor or an Alternating Current (AC) fan motor is used. When a DC fan motor is used as a driving source of the indoor fan 6, the amount of air is adjusted by changing the current value to thereby control the rotation speed. When an AC fan motor is used as the driving source of the indoor fan 6, the amount of air is adjusted by changing the power frequency by inverter control to thereby control the rotation speed.

In Embodiment, a case where the indoor heat exchanger 5 is an air-cooled type indoor heat exchanger is described. The type of the indoor heat exchanger 5 is not limited thereto. The indoor heat exchanger 5 may be of other types such as a water-cooled type. When the indoor heat exchanger 5 is a water-cooled type indoor heat exchanger, a pump (not illustrated) is provided in place of the indoor fan 6.

The controller 50 controls each actuator, such as the frequency of the compressor 1, the opening degree of the expansion device 4, and the rotation speed of the indoor fan 6, based on the temperature information and the pressure information detected by each detector. The controller 50 includes, for example, dedicated hardware or a CPU (also called a central processing unit, a processing unit, an arithmetic unit, a microprocessor, or a processor) that executes a program stored in a memory.

Figure 3:
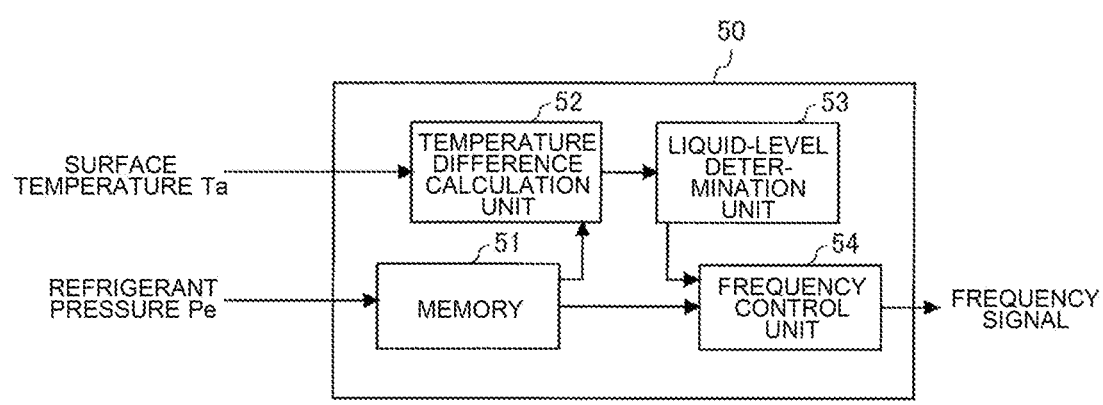
FIG. 3 is a functional block diagram illustrating one example of the controller illustrated in FIG. 1.
Figure 4:
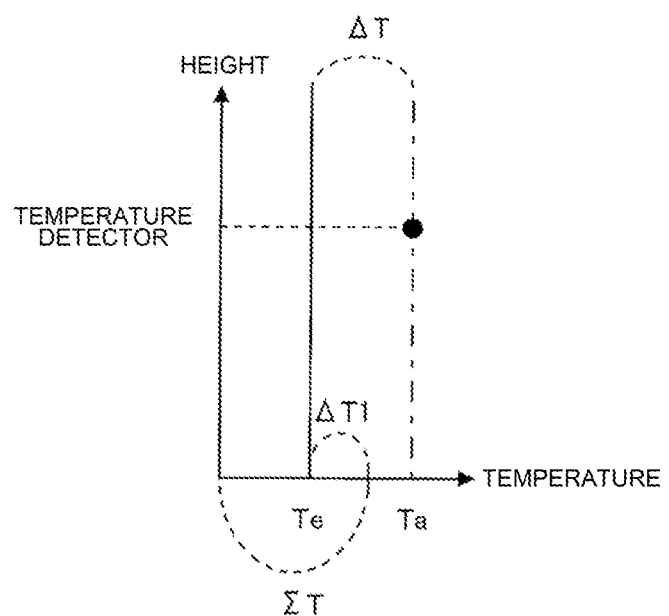
FIG. 4 is a graph illustrating a relationship between a temperature difference and a threshold value, where the temperature difference is calculated by subtracting a saturation temperature of the refrigerant from a surface temperature of the accumulator of the liquid level detector according to Embodiment.

FIG. 3 is a functional block diagram illustrating one example of the controller 50 of the air-conditioning apparatus 100 according to Embodiment. FIG. 4 is a graph illustrating the relationship between the temperature difference $\Delta T$ and the threshold value $\Delta T1$, where the temperature difference $\Delta T$ is calculated by subtracting the saturation temperature Te of the refrigerant from the surface temperature Ta of the accumulator 31 of the liquid level detector 30 according to Embodiment.

As illustrated in FIG. 3, the controller 50 includes a memory 51, a temperature difference calculation unit 52, a liquid level determination unit 53, and a frequency control unit 54.

The memory 51 is, for example, a ROM, a flash memory, an EPROM, an EEPROM, or the like. The memory 51 stores in advance a function or a table used to calculate the saturation temperature Te of the refrigerant from the pressure Pe of the refrigerant detected by the pressure detector 34, and also stores information such as the threshold value $\Delta T1$ used by the liquid level determination unit 53 that will be mentioned later. In Embodiment, the memory 51 is provided in the controller 50. However, this is not restrictive, and the memory 51 may be provided separately from the controller 50.

The temperature difference calculation unit 52 uses the information stored in the memory 51 to calculate the saturation temperature Te of the refrigerant from the pressure Pe of the refrigerant detected by the pressure detector 34. Then, as illustrated in FIG. 4, the temperature difference calculation unit 52 subtracts the saturation temperature Te of the refrigerant from the surface temperature Ta detected by the temperature detector 33 to thereby calculate the temperature difference $\Delta T$, which is the degree of superheat on the suction side of the compressor 1.

The liquid level determination unit 53 reads the threshold value $\Delta T1$ stored in the memory 51, and compares the temperature difference $\Delta T$ calculated by the temperature difference calculation unit 52 with the threshold value $\Delta T1$. The threshold value $\Delta T1$ is used to determine whether the state of the refrigerant positioned at the temperature detector 33 in the accumulator 31 is a gas state or a liquid state. For example, the threshold value $\Delta T1$ is +3 degrees C., but the threshold value $\Delta T1$ is not limited thereto. The liquid level determination unit 53 then determines the position of the liquid surface 40 of the refrigerant in the accumulator 31 based on the comparison results. Specifically, when the temperature difference $\Delta T$ is greater than the threshold value $\Delta T1$, the liquid level determination unit 53 determines that, since the above-mentioned degree of overheating is sufficiently large, the position at which the temperature detector 33 is provided is filled with the gas refrigerant, and the liquid surface 40 of the refrigerant in the accumulator 31 is positioned lower than the position at which the temperature detector 33 is provided. On the other hand, if the temperature difference $\Delta T$ is less than or equal to the threshold value $\Delta T1$, the liquid level determination unit 53 determines that, since the degree of superheat described above is not sufficiently large, the position at which the temperature detector 33 is provided is filled with liquid refrigerant, and the liquid surface 40 of the refrigerant in the accumulator 31 is positioned higher than or equal to the position at which the temperature detector 33 is provided.

Alternatively, the temperature difference calculation unit 52 uses the information stored in the memory 51 to calculate the saturation temperature Te of the refrigerant from the pressure Pe of the refrigerant detected by the pressure detector 34. Then, the temperature difference calculation unit 52 reads the threshold value $\Delta T1$ stored in the memory 51, and adds the threshold value $\Delta T1$ to the calculated saturation temperature Te of the refrigerant, whereby the temperature sum $\Sigma T$ is calculated (see FIG. 4).

The liquid level determination unit 53 compares the surface temperature Ta detected by the temperature detector 33 with the temperature sum $\Sigma T$. Then, the liquid level determination unit 53 determines the position of the liquid surface 40 of the refrigerant in the accumulator 31 based on the comparison result. Specifically, when the surface temperature Ta is greater than the temperature sum $\Sigma T$, the liquid level determination unit 53 determines that, at the position where the temperature detector 33 is provided, the accumulator 31 is filled with gas refrigerant, and the position of the liquid surface 40 of the refrigerant in the accumulator 31 is lower than the position where the temperature detector 33 is provided. On the other hand, when the surface temperature Ta is less than or equal to the temperature sum $\Sigma T$, the liquid level determination unit 53 determines that, at the position where the temperature detector 33 is provided, the accumulator 31 is filled with liquid refrigerant, and the liquid surface 40 of the refrigerant in the accumulator 31 is positioned higher than the position at which the temperature detector 33 is provided.

The frequency control unit 54 determines the frequency of the compressor 1 by referring to the frequency information stored in the memory 51 based on the position of the liquid surface 40 of the refrigerant in the accumulator 31 determined by the liquid level determination unit 53. Then, the frequency control unit 54 supplies a frequency control signal indicating the determined frequency of the compressor 1 to the compressor 1. For example, when the position of the liquid surface 40 of the refrigerant in the accumulator 31 determined by the liquid level determination unit 53 is lower than the position where the temperature detector 33 is provided, the frequency control unit 54 supplies a frequency control signal with a frequency of f1 to the compressor 1. When the position of the liquid surface 40 of the refrigerant in the accumulator 31, which is detected by the liquid level determination unit 53, is higher than or equal to the position where the temperature detector 33 is provided, the frequency control unit 54 supplies a frequency control signal with a frequency f2 (>f1) to the compressor 1. In this way, when the position of the liquid surface 40 of the refrigerant in the accumulator 31 is high, the amount of the liquid refrigerant flowing out of the accumulator 31 is increased by increasing the frequency of the compressor 1, whereby the position of the liquid surface 40 of the refrigerant in the accumulator 31 is lowered.

As mentioned above, the liquid level detector 30 according to Embodiment comprises the vertically-mounted accumulator 31 configured to store refrigerant, the heater 32 configured to heat the accumulator 31, the temperature detector 33 configured to detect the surface temperature Ta of the accumulator 31, the pressure detector 34 configured to detect the pressure of the refrigerant in the accumulator 31, and the controller 50 configured to detect the position of the liquid surface 40 of the refrigerant in the accumulator 31 based on the surface temperature Ta of the accumulator detected by the temperature detector 33 when heated by the heater 32 and the pressure Pe of the refrigerant in the accumulator 31 detected by the pressure detector 34.

The air-conditioning apparatus 100 according to Embodiment is provided with the liquid level detector 30 mentioned above.

According to the liquid level detector 30 and the air-conditioning apparatus 100 including the same, due to provision of the vertically-mounted accumulator 31, rippling hardly occurs on the liquid surface 40 of the refrigerant in the accumulator 31 as compared with a case where the horizontally-mounted accumulator is provided, whereby the accuracy of detecting the position of the liquid surface 40 can be improved. Further, based on the surface temperature Ta of the accumulator 31 detected by the temperature detector 33 and the pressure Pe of the refrigerant in the accumulator 31 detected by the pressure detector 34, the position of the liquid surface 40 of the liquid in the accumulator 31 is detected. Therefore, a plurality of temperature detectors 33 are not required to be provided, leading to a reduction in cost.

The invention claimed is:

1. A liquid level detector, comprising:
    a vertically-mounted accumulator provided on a suction side of a compressor and configured to store refrigerant;
    a heater configured to heat the accumulator;
    a temperature detector configured to detect a surface temperature of the accumulator;
    a pressure detector configured to detect a pressure of the refrigerant in the accumulator; and
    a controller configured to detect a position of the liquid surface of the refrigerant in the accumulator based on a surface temperature of the accumulator detected by the temperature detector when the accumulator is heated by the heater, and a pressure of the refrigerant in the accumulator detected by the pressure detector,
    wherein the controller calculates a saturation temperature of the refrigerant from a pressure of the refrigerant detected by the pressure detector, and adds the preset threshold value to the calculated saturation temperature to thereby calculate a temperature sum,
    determines the position of the liquid surface of the refrigerant in the accumulator based on a result of comparison of the calculated temperature sum and the surface temperature detected by the temperature detector, and
    determines a frequency of the compressor based on the determined position of the liquid surface of the refrigerant in the accumulator.

2. The liquid level detector of claim 1, further comprising a memory that stores information used to calculate a saturation temperature of the refrigerant from a pressure of the refrigerant detected by the pressure detector, and stores the threshold value.

3. An air-conditioning apparatus comprising the compressor and the liquid level detector of claim 1.

* * * * *